(12) United States Patent
Smith et al.

(10) Patent No.: US 12,078,219 B2
(45) Date of Patent: Sep. 3, 2024

(54) ARTICULATING BRAKE PISTON JUNCTION

(71) Applicant: HL MANDO CORPORATION, Gyeonggi-do (KR)

(72) Inventors: Daniel Smith, Bay City, MI (US); James Browne, Novi, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 95 days.

(21) Appl. No.: 17/321,360

(22) Filed: May 14, 2021

(65) Prior Publication Data

US 2022/0364617 A1    Nov. 17, 2022

(51) Int. Cl.
*F16D 65/18*      (2006.01)
*F16D 121/04*     (2012.01)
*F16D 125/58*     (2012.01)

(52) U.S. Cl.
CPC .......... *F16D 65/18* (2013.01); *F16D 2121/04* (2013.01); *F16D 2125/587* (2013.01)

(58) Field of Classification Search
CPC . F16D 65/18; F16D 2121/04; F16D 2125/587
See application file for complete search history.

(56) References Cited

U.S. PATENT DOCUMENTS

| | | | | |
|---|---|---|---|---|
| 2,754,936 A | * | 7/1956 | Henry | F16D 55/228 188/73.34 |
| 2,861,655 A | * | 11/1958 | Henry | F16D 55/228 188/196 P |
| 2,937,722 A | * | 5/1960 | Ruet | F16D 65/095 188/72.5 |
| 3,224,532 A | * | 12/1965 | Simon | F16D 55/228 188/72.5 |
| 5,205,382 A | * | 4/1993 | Edmisten | F16D 65/84 188/196 R |
| 6,719,103 B1 | * | 4/2004 | Kapaan | F16D 65/18 188/162 |
| 6,932,197 B2 | * | 8/2005 | Lumpkin | B62L 1/00 188/73.31 |
| 9,850,971 B1 | | 12/2017 | Demorais et al. | |
| 9,926,073 B2 | * | 3/2018 | Drennen | B64C 25/44 |
| 2018/0298963 A1 | * | 10/2018 | Demorais | F16D 55/225 |

(Continued)

FOREIGN PATENT DOCUMENTS

| | | | | |
|---|---|---|---|---|
| DE | | 1855586 | * 7/1962 | |
| DE | | 1917555 A1 | * 10/1969 | F16D 55/32 |

(Continued)

OTHER PUBLICATIONS

Machine translation of JP-09049537-A (no date).*

(Continued)

*Primary Examiner* — Nicholas J Lane
(74) *Attorney, Agent, or Firm* — Womble Bond Dickinson (US) LLP

(57) ABSTRACT

A piston system configured for use in a brake system is disclosed. The piston system can include: a piston that moves within a caliper during braking operations; and an articulating joint located between the piston and a brake pad, wherein the braking force passes through the articulating joint during a braking operation. Different types of articulating joints are also described.

6 Claims, 8 Drawing Sheets

(56) References Cited

U.S. PATENT DOCUMENTS

| | | | |
|---|---|---|---|
| 2019/0032735 A1* | 1/2019 | Lethorn | ................ F16D 55/22 |
| 2020/0158198 A1 | 5/2020 | Smith et al. | |
| 2020/0378456 A1* | 12/2020 | Haines | ................ F16D 55/228 |

FOREIGN PATENT DOCUMENTS

| | | | | |
|---|---|---|---|---|
| DE | 10218112 A1 | * | 11/2003 | ......... F16D 65/0971 |
| FR | 2005742 A1 | * | 12/1969 | ............ F16D 55/32 |
| GB | 840392 A | * | 7/1960 | ........... F16D 55/228 |
| JP | 07305734 A | * | 11/1995 | ............ F16D 65/14 |
| JP | 08014280 A | * | 1/1996 | ............ F16D 65/14 |
| JP | 09049537 A | * | 2/1997 | ............ F16D 65/14 |
| JP | 2013-245794 A | | 12/2013 | |
| KR | 10-2019-0096828 | | 8/2019 | |

OTHER PUBLICATIONS

Machine translation of DE-10218112-A1 (no date).*
Machine translation of JP-07305734-A (no date).*
Machine translation of DE-1855586 (no date).*
Machine translation of FR 2646216 (no date).*
Machine translation of FR 2005742 (no date).*
U.S. Appl. No. 17/221,692, filed Apr. 2, 2021, Smith et al.

* cited by examiner

SECTION B-B

ARTICULATING BRAKE PISTON JUNCTION

TECHNICAL FIELD

This disclosure relates to brake systems, such as vehicular brake systems, that include a piston for operation of the braking system.

BACKGROUND

Brake systems, such as disk brake systems on vehicles such as cars and trucks, can include caliper housings and one or more pistons within the caliper housings. In operation, the disk brake system can cause brake pads to press against opposite contact surfaces of a brake rotor in order to generate tangential friction force to cause a braking effect. The disk brake system can include a piston which in response to a signal moves against a brake pad to cause a braking effect.

SUMMARY

In a first aspect disclosed herein, a brake piston system is provided. The brake system comprising: a piston that moves within a caliper during braking operations; and an articulating joint located between the piston and a brake pad, wherein the braking force passes through the articulating joint during a braking operation.

In a first embodiment of the first aspect, the brake system further comprising a footing located between the piston and the brake pad, wherein the articulated joint joins the piston to the footing.

In a second embodiment of the first aspect, the brake system further comprising a footing located between the piston and the brake pad, wherein the articulated joint joins the piston to the footing, and the articulated joint comprises first and second bearing surfaces configured to press against one another and slide in relation to one another to pivot around a first axis.

In a third embodiment of the first aspect, the brake system further comprising a footing located between the piston and the brake pad, wherein the articulated joint joins the piston to the footing, and the articulated joint comprises first and second bearing surfaces configured to press against one another and slide in relation to one another to pivot around a first axis, and the first and second bearing surfaces are configured to press against one another and slide in relation to one another to pivot around a first and a second axis.

In a fourth embodiment of the first aspect, the brake system further comprising a footing located between the piston and the brake pad, wherein the articulated joint joins the piston to the footing, and the articulated joint comprises first and second bearing surfaces configured to press against one another and slide in relation to one another to pivot around a first axis, and the first and second bearing surfaces are configured to press against one another and slide in relation to one another to pivot around a first, a second axis and a third axis.

In a fifth embodiment of the first aspect, the brake piston system further comprising a footing located between the piston and the brake pad, wherein the articulated joint joins the piston to the footing, and the articulated joint is a ball and socket joint or a truncated ball and socket joint or a saddle joint or an ellipsoidal joint or a truncated ellipsoidal joint.

In a sixth embodiment of the first aspect, the brake system further comprising a footing located between the piston and the brake pad, wherein the articulated joint joins the piston to the footing, and the articulated joint comprises first and second bearing surfaces configured to press against one another and slide in relation to one another to pivot around a first axis, and the first bearing surface is curved in three dimensions.

In a seventh embodiment of the first aspect, the brake piston system further comprising a footing located between the piston and the brake pad, wherein the articulated joint joins the piston to the footing, the articulated joint is a ball and socket joint, and the footing comprises a ball of the ball and socket joint and the piston comprises a socket of the ball and socket joint.

In a eighth embodiment of the first aspect, the brake piston system further comprising a footing located between the piston and the brake pad, wherein the articulated joint joins the piston to the footing, and the articulated joint is a truncated ball and socket joint.

In a ninth embodiment of the first aspect, the brake piston system further comprising a footing located between the piston and the brake pad, wherein the articulated joint joins the piston to the footing, and the articulated joint is a truncated ball and socket joint, and the footing comprises a truncated sphere of the truncated ball and socket joint and the piston comprises a socket portion of the truncated ball and sphere joint.

In a tenth embodiment of the first aspect, the brake piston system further comprising a footing located between the piston and the brake pad, wherein the articulated joint joins the piston to the footing, and the articulated joint comprises: a convex outward bearing surface; and a concave outward bearing surface that slidably interfaces with the convex outward bearing surface, wherein the convex outward bearing surface is located affixed to or a part of the piston, and the concave outward bearing surface is located affixed to or a part of the footing.

In a eleventh embodiment of the first aspect, the brake piston system further comprising a footing located between the piston and the brake pad, wherein the articulated joint joins the piston to the footing, and the articulated joint comprises: a convex outward bearing surface; and a concave outward bearing surface that slidably interfaces with the convex outward bearing surface, wherein the convex outward bearing surface is located affixed to or a part of the footing, and the concave outward bearing surface is located affixed to or a part of the piston.

In a second aspect disclosed herein, a brake piston bearing block is provided. The brake piston bearing block comprising a bearing surface of an articulatable joint, and the bearing block is configured to articulatably transfer a braking force to the brake pad during a braking operation.

In a first embodiment of the second aspect, the brake piston bearing block further comprises a concave bearing surface that is configured to slidably interface with a convex bearing surface to articulatably transfer the braking force to the brake pad during a braking operation.

In a second embodiment of the second aspect, the brake piston bearing block further comprises a convex bearing surface that is configured to slidably interface with a concave bearing surface to articulatably transfer the braking force to the brake pad during a braking operation.

In a third embodiment of the second aspect, the brake piston bearing block further comprises a concave bearing surface that is configured to slidably interface with a convex bearing surface to articulatably transfer the braking force to the brake pad during a braking operation, and the concave bearing surface is a part of a ball and socket or a truncated ball and socket joint or a saddle joint or an ellipsoidal joint or a truncated ellipsoidal joint.

In a fourth embodiment of the second aspect, the brake piston bearing block further comprises a convex bearing surface that is configured to slidably interface with a concave bearing surface to articulatably transfer the braking force to the brake pad during a braking operation, and the convex bearing surface is a part of a ball and socket or a truncated ball and socket joint or a saddle joint or an ellipsoidal joint or a truncated ellipsoidal joint.

In a third aspect disclosed herein, a brake footing configured for use in a brake caliper and to articulatably interface with a nose of a brake piston through an articulatable joint and to transfer a braking force to a brake pad during a braking operation received through the articulatable joint.

In some embodiments, the brake footing comprises a concave bearing surface that is a part of the articulatable joint.

In certain embodiments, the brake footing comprises a convex bearing surface that is a part of the articulatable joint.

In some embodiments, the concave bearing surface is a part of a ball and socket or a truncated ball and socket joint or a saddle joint or an ellipsoidal joint or a truncated ellipsoidal joint.

In certain embodiments, the convex bearing surface is a part of a ball and socket or a truncated ball and socket joint or a saddle joint or an ellipsoidal joint or a truncated ellipsoidal joint.

DETAILED DESCRIPTION

Figure 1:
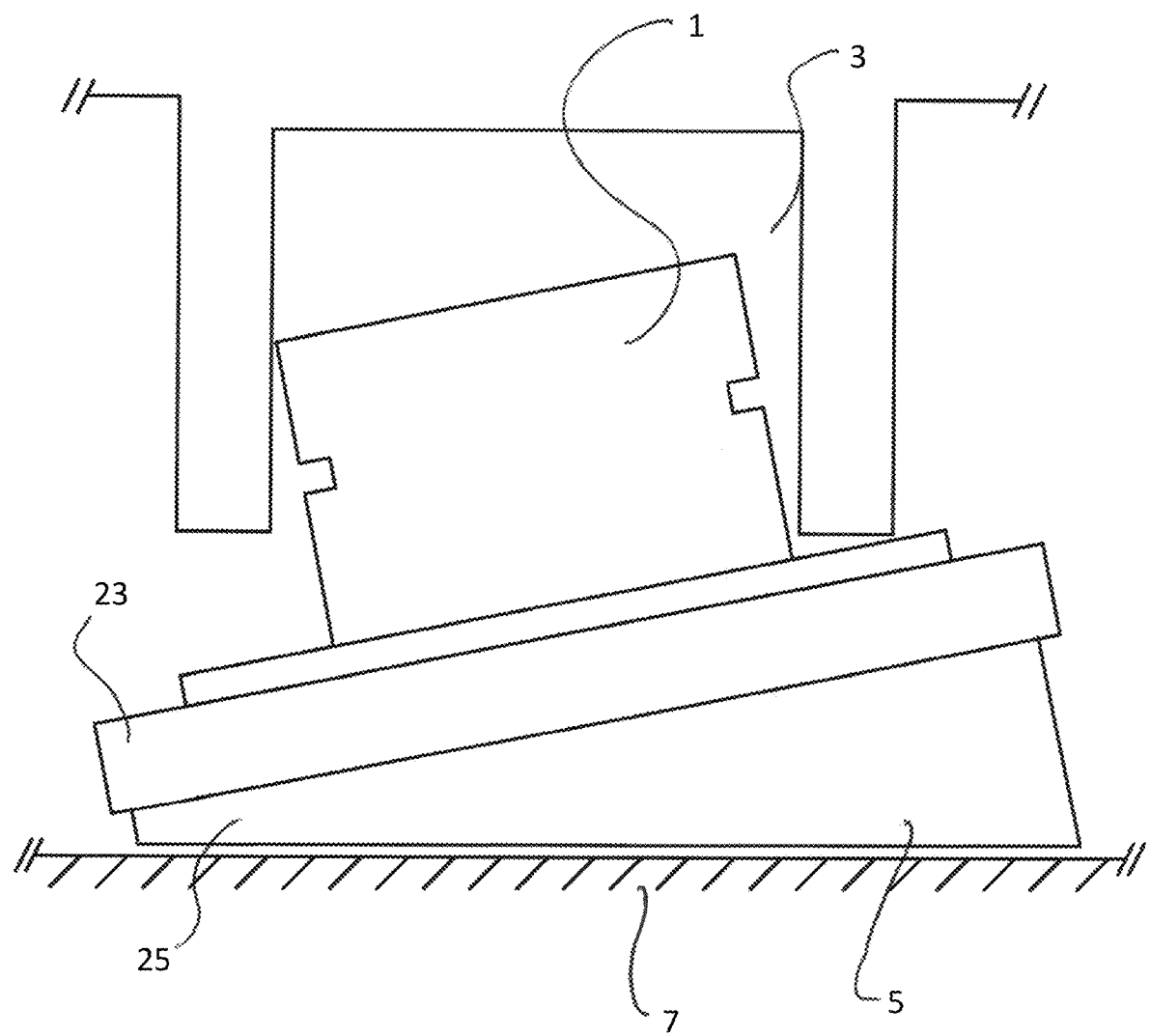
FIG. 1 shows an embodiment of a brake piston subject to misalignment due to brake pad wear.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure relates to disk brake caliper pistons and piston systems, such as are used for various vehicles including automobiles, trucks, aircraft and the like. Embodiments of the disclosure include pistons having provision for and articulating junction between the piston and the brake pad. The articulating junction can, in some embodiments, serve to transfer a braking force from the piston to the brake pad during a braking operation. In some embodiments, the articulating junction can articulate to compensate for uneven wear of the brake pad while allowing the piston to maintain a more parallel orientation to the piston cylinder bore.

In some embodiments, the articulatable junction can also be utilized with a brake piston footing that can provide an oversized bearing surface for contacting a brake pad (or brake pad backing plate) to extend and/or distribute the braking force of the brake piston over a larger area of the brake pad (or brake pad backing plate) than of the cross-sectional area of the piston.

As vehicles are made larger and heavier, greater braking force can be helpful in stopping the vehicle. Increased braking force can be accomplished in a number of ways, such as by pushing harder on the brake pedal, increasing the hydraulic advantage within the braking system to achieve greater pressure at the brake piston, increasing the torque delivered to a linear motion converter in the brake system, such as by increasing the torque of a motor or adding a gearbox or other torque multiplier, decreasing the frictional (e.g. viscous, mechanical, etc.) losses in the brake system, increasing the number of brake pistons to increase the brake force achieved for a given hydraulic pressure or to increase the diameter of the piston to increase the brake force achieved for a given hydraulic pressure.

Increasing the number of pistons can result in problems with implementing a parking brake system integrated with the brake piston. The reason for this can include that the spindle/nut arrangement, shown for example in FIG. 1, should be implemented on both pistons associated with a wheel or risk uneven wear and/or uneven application of brakes which can lead to other operational problems such as binding of the piston.

Simply increasing the diameter of the piston can be limited by the width of the brake pad and by other system dimensions.

Increasing the pressure that the piston operates at to increase the force can also carry a risk of distorting the brake pad due to the presence of a highly localized force (at the piston), which can also lead to uneven wear and other operational problems.

Accordingly, there can be advantages to utilizing a single larger diameter piston and then extending or distributing the force from the piston over a larger area or a differently shaped area of the brake pad (or brake pad backing plate.)

In some embodiments of a brake piston, uneven wear of the brake pad can result in the brake pad contacting the brake disk unevenly, such as where one region of the brake pad contacts the brake disk before other portions of the brake pad. Such a situation can result in a torque being applied to the piston and rotation of the piston within the cylinder bore as shown in FIG. 1. Here the piston 1 is tipped in the cylinder bore 3 when the unevenly worn brake pad 5 is pushed against the brake rotor surface 7.

Tipping or rotation of the piston 1 within the cylinder bore 3 can result in binding of the piston or uneven braking response during brake operation, but during application and release of the brakes.

Figure 2:
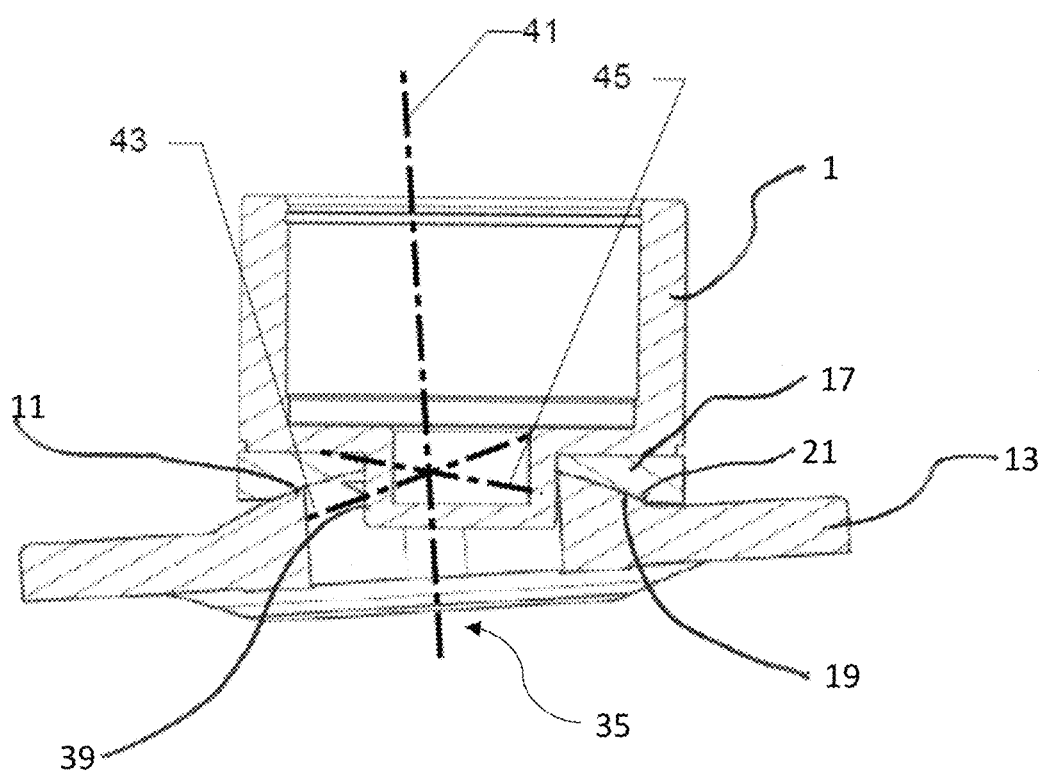
FIG. 2 shows an embodiment of a brake piston assembly with an embodiment of an articulatable joint.

In some embodiments, an articulated joint 11 can be located between the piston 1 and the brake pad or the location of the brake pad or brake pad backing plate 23, such as is shown in FIG. 2. Here an articulated joint 11 is located at the end of the piston 1 proximal the location of the brake pad or brake pad backing plate 23. In operation, the end of the brake piston 1 contacts a bearing block 17 of the articulated joint 11 of the articulated joint which also contacts a bearing surface 19 of the brake pad footing 13. In operation, during the application of the brake, the piston 1 moves toward the brake pad or brake pad backing plate and pushes the bearing block 17 against the bearing surface 19 of the footing 13, and the brake footing 13 then pushes the brake pad against the brake rotor.

In situations where the brake pad has been worn unevenly, as the brake pad contacts the brake rotor, the brake pad backing plate will tilt to allow more of the brake pad to contact the brake rotor, with the bearing surface 19 of the footing 13 sliding along the corresponding bearing surface 21 of the bearing block 17 with the force from the piston 1 being transferred through the bearing block bearing surface 21 and the brake pad backing plate bearing surface 19 to the brake pad 25 and brake rotor.

In some embodiments, the footing 13 and the bearing block 17 can form a joint that allows transfer of the force from the piston to the brake pad while allowing angular alignment adjustment between the brake pad 5 and the piston 1.

In some embodiments, the joint can comprise interfacing concave and convex surfaces that slidably interface with one another.

In some embodiments, the joint can pivot around one or two or three axes, where a first axis 41 is normal to the brake pad backing plate, and second 43 and third 45 axes are normal to the first axis and to each other. FIG. 2 shows a first axis 41, a second axis 43, with a third axis 45. FIG. 2 shows the joint pivoting around the second and third axis, while the joint of FIG. 2 can pivot around only one of the first, second and third axis, or can pivot around any two of the first, second and third axis or can pivot around all three of the first, second and third axis. When pivoting occurs around more than one axis, the extent of pivoting can be the same or different among the axes.

In some embodiments, the joint can comprise two bearing surfaces 21, 19 which press against one another, and slide in relation to one another to pivot around the first, second and/or third axis.

Figure 8A:
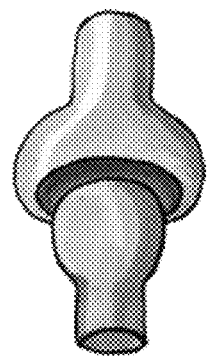
FIGS. 8A-8C are schematic drawings of embodiments of a ball joint (8A), ellipsoid joint (8B) and a saddle joint (8C).
Figure 8B:
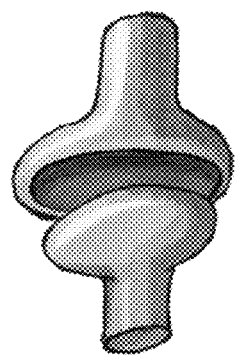
Figure 8C:
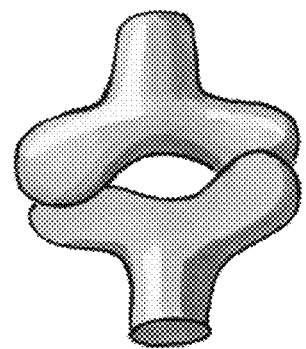

In some embodiments, the joint can comprise a brake pad backing plate and the bearing block 17 can form a ball and socket joint or a truncated ball and socket joint with respective bearing surfaces 21, 19 having surfaces that correspond to a sphere or a portions of a sphere or that approximate a sphere or a portion of a sphere. In some embodiments, joints can utilize one or both bearing surfaces 21, 19 that are curved in three dimensions, such as ball, ellipsoidal or saddle or other shapes that allows pivoting around one, two and/or three axes that allows angular alignment adjustment of the brake pad, brake pad backing plate or footing in relation to the piston or bearing block in a desired direction, such as to compensate for uneven wear of the brake pad. Schematics of embodiments of some joints including bearing surfaces curved in three dimensions are shown in FIG. 8A (ball joint), FIG. 8B (ellipsoidal joint) and FIG. 8C (saddle joint.) The surfaces curved in three dimensions can be convex, concave, a mixture of convex and/or concave, and can optionally include flat (planar) portions.

Figure 3:
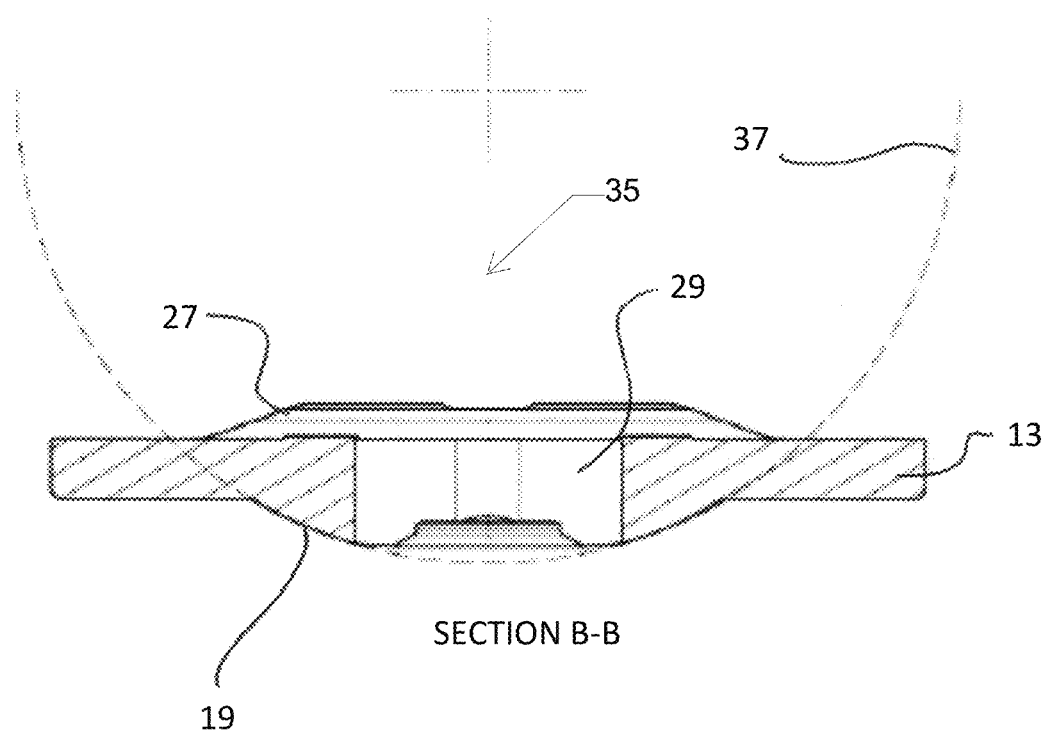
FIG. 3 shows an embodiment of a footing for a brake piston with an embodiment of an articulatable joint.
Figure 4:
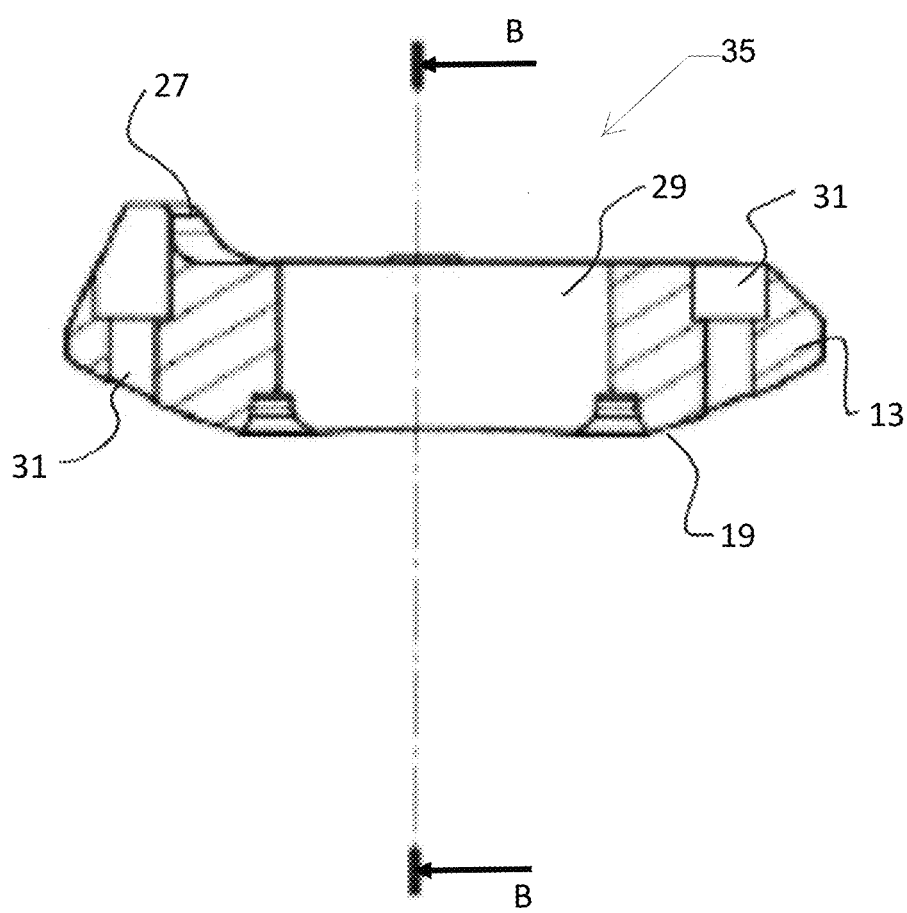
FIG. 4 shows an embodiment of a footing for a brake piston with an embodiment of an articulatable joint.
Figure 5:
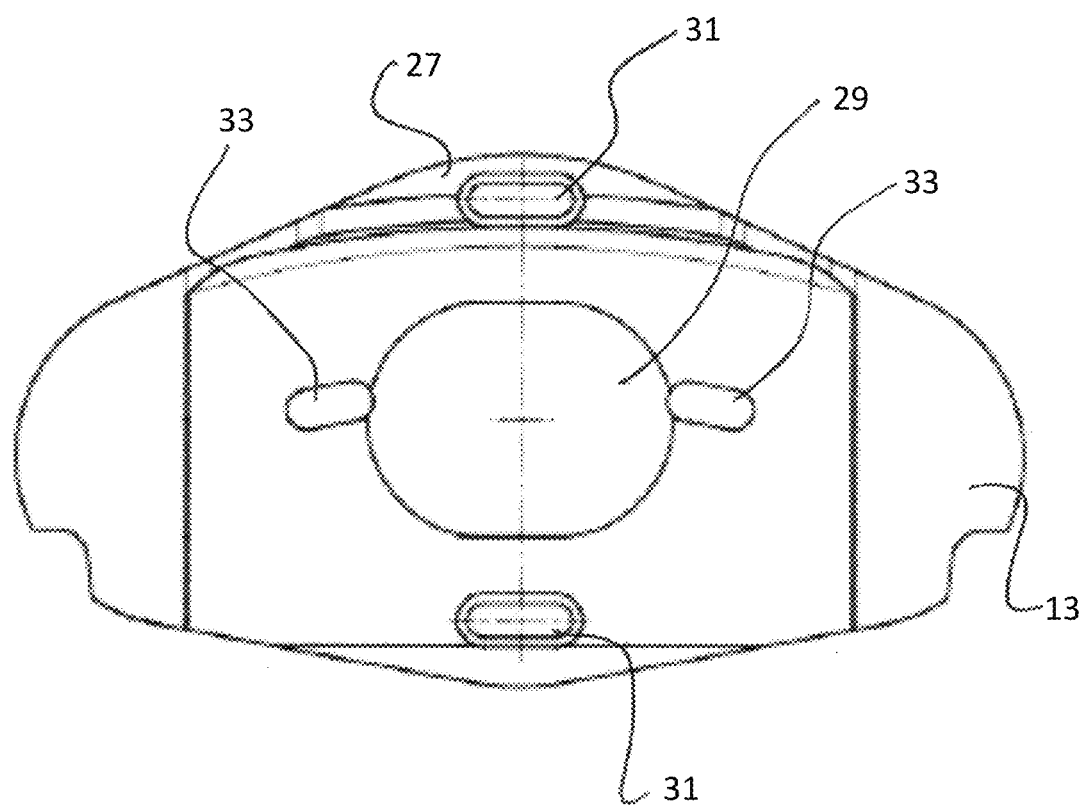
FIG. 5 shows an embodiment of a footing for a brake piston with an embodiment of an articulatable joint.

FIGS. 3-5 shows different views of an embodiment of a footing that has a footing bearing surface 19 that is a portion of a sphere. FIG. 3 is a section through FIG. 4 and FIG. 5 is a bottom view (the side toward a brake pad backing plate) of an embodiment of a footing 13 showing the curvature 37 of the bearing surface 19. In this embodiment, the bearing surface 19 is in a central portion of the footing 13 and extends near or to edges of the footing in the narrow dimension of the footing 13, as can be seen in FIG. 4, but extend only part way to the edges of the footing 13 in the long dimension of the footing in FIG. 3. In additional embodiments, the bearing surface 19 can extend only part way to one or both edges of the footing 13 in the narrow dimension of the footing 13. In some particular embodiments, the bearing surface can extend to or near one or more edges of the footing 13 in the long dimension of the footing.

As can be seen in FIGS. 3-5, the footing can include a relief region 29 that can comprise a hole passing through the footing or a depression that extends into the footing to provide room for a portion of the piston, such as a nose 39 of the piston 1 to extend into the footing 13.

Also shown in FIGS. 3-5 are optional holes 31 for attaching the footing 13 to the bearing block 17 and/or piston 1. In some embodiments, screws, pins, clips or other types of fasteners and that allow retraction of the footing with the piston when the brakes are released and also allow relative movement of the footing bearing surface 19 and the bearing block bearing surface 21 can be used to attach the bearing block to the bearing block 17 and/or piston 1.

Also shown in FIGS. 3-5 is a lip 27 that can be adjacent to the brake pad region 35 where the brake pad 5 and/or brake pad backing plate 23 can be located after assembly of the brake system.

FIG. 5 also includes optional brake pad indexes 33 which can comprise extensions or recesses located on the face of the footing 13 which can be used to align the footing 13 with the brake pad backing plate 23, such as by interfacing with recess(es) or extension(s) in the backing plate 23. Footing 13 can also include brake pad contact point for distributing the braking force over the surface of the brake pad backing plate 23.

Figure 6:
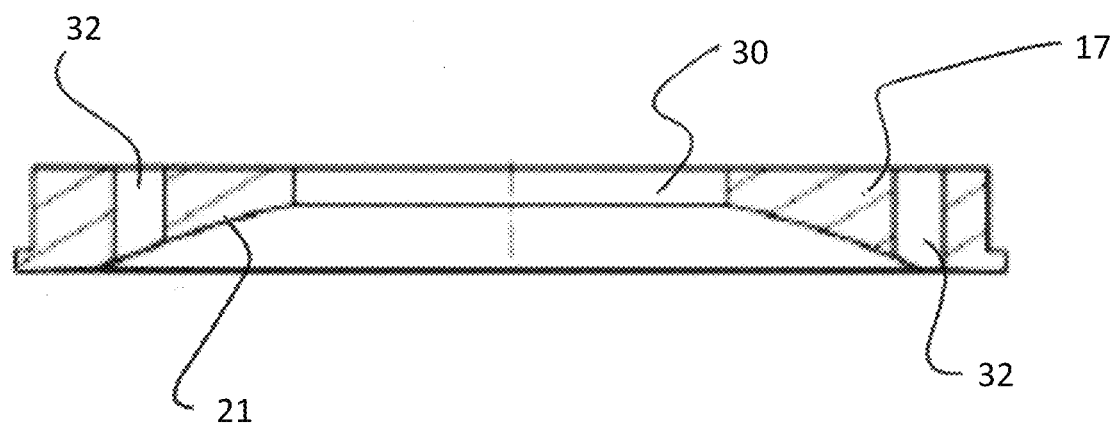
FIG. 6 shows an embodiment of a bearing ring for a brake piston with an embodiment of an articulatable joint.
Figure 7:
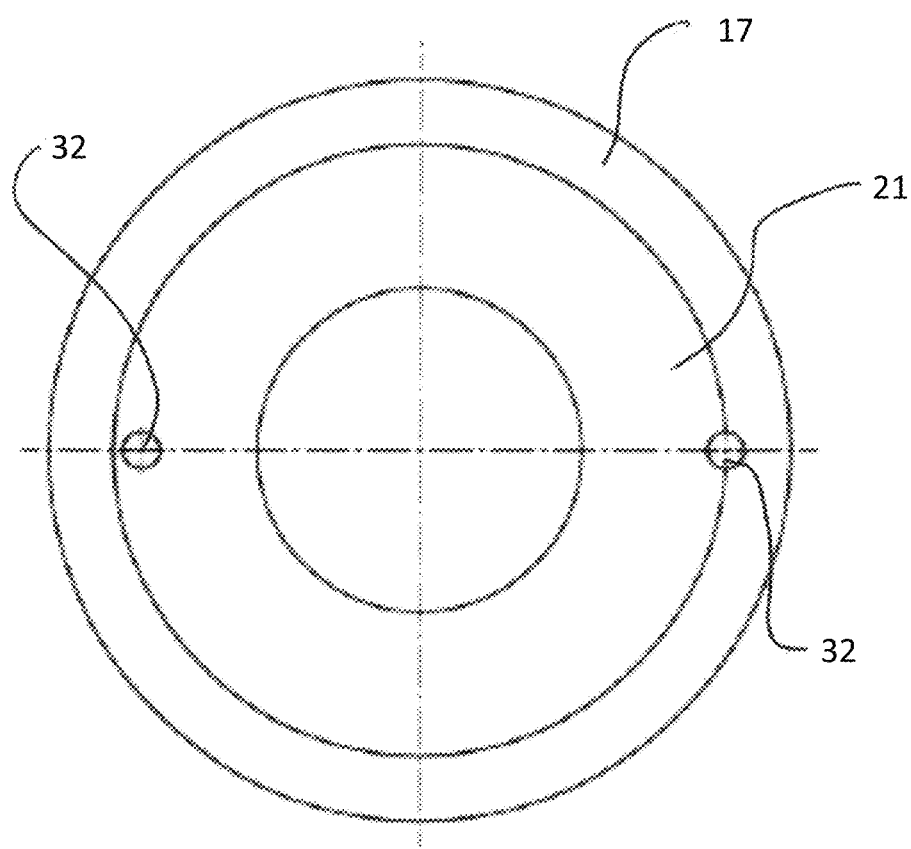
FIG. 7 shows an embodiment of a bearing ring for a brake piston with an embodiment of an articulatable joint.

FIG. 6 shows an embodiment of a bearing block 17 with a bearing surface 21 which corresponds to a footing bearing surface 19 to transfer force from the piston 1 to the brake pad 25 and to slidably interface to allow angular alignment adjustment of the brake 25 and the piston 1. Also shown in FIG. 6 are optional holes 32 which can be used to attach the bearing block 17 to the piston 1. In some embodiments, holes 32 can also be used for attachment of the footing 13 to the piston 1, such as by providing a location for fasteners to pass through the bearing block 17 to the piston 1. FIG. 7 shows a view the side of a bearing block 17 with bearing surface 21 (which in this embodiment is concave and could interface with a convex bearing surface of a footing 13.)

Also shown in FIG. 6 is optional opening 30 which can allow the piston nose 39 to extend into the bearing block 17. In some embodiments, the opening 30 can pass through the bearing block 17 and in some embodiments the opening 30 can pass only part way through the bearing block 17. The nose 39 can in some embodiments pass through the bearing block 17 and enter the footing 13. In some embodiments, the nose 39 can enter or pass through the bearing block 17, but not enter the footing 13.

In some embodiments, the bearing block 17 can be a separate part that is assembled to the piston 1. In some embodiments, the bearing block 17 can be integral to the piston 1, such as by molding, machining, etc. In some embodiments, the bearing block 17 can be attached to the piston 1, such as by the use of fasteners (e.g. screws, pins, tabs, clips, etc.), or by threading, pressing etc. or by adhesive or by welding or by any method that allows the bearing block 17 to be retracted by the piston 1 when the brakes are released.

In some embodiments, the footing 13 can be can be a separate part that interfaces with the brake pad backing plate 23 and the bearing block 17. In some embodiments, the footing 13 can be integral to the brake pad backing plate 23, such as by molding, machining, etc. In some embodiments, the footing 13 can be attached to the brake pad backing plate 23, such as by the use of fasteners (e.g. screws, pins, tabs, clips, etc.), or by threading, pressing etc. or by adhesive or by welding or by any method that allows the footing 13 maintain contact with the backing plate 23 and be retracted by the piston 1 when the brakes are released.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. Use of language such as "approximately", "somewhat", "about", "nearly" and other terms of degree that appear within this disclosure are intended to be interpreted as a person of skill in the art would understand the language based upon the context, with a further understanding that if the context provides insufficient guidance, a tolerance of 20% should be applied. Use of the word "or" should be understood to also include the meaning "and", except where the context indicates otherwise. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

The invention claimed is:

1. A brake piston system comprising:
a piston configured to be movable within a caliper during braking operations;
an articulating joint located between the piston and a brake pad, wherein the braking force passes through the articulating joint during a braking operation; and
a footing located between the piston and the brake pad, wherein the articulating joint joins the piston to the footing,
wherein:
the articulating joint comprises:
a convex outward bearing surface; and
a concave outward bearing surface that slidably interfaces with the convex outward bearing surface, wherein the convex outward bearing surface is affixed to or a part of the footing, and the concave outward bearing surface is affixed to or a part of the piston,
a protruded portion of the piston extends into an opening comprised in the articulating joint, and
the footing has one or more holes for attaching the footing to the piston.

2. The brake piston system of claim 1, wherein the articulated joint is a ball and socket joint or a truncated ball and socket joint or a saddle joint or an ellipsoidal joint or a truncated ellipsoidal joint.

3. The brake piston system of claim 1, wherein the footing comprises a ball of the ball and socket joint and the piston comprises a socket of the ball and socket joint.

4. The brake piston system of claim 1, wherein the articulating joint is a truncated ball and socket joint.

5. The brake piston system of claim 4, wherein the footing comprises a truncated sphere of the truncated ball and socket joint and the piston comprises a socket portion of the truncated ball and sphere joint.

6. The brake piston system of claim 1, further comprising one or more brake pad indexes having extensions or recesses located on a face of the footing to align the footing with the brake pad.

* * * * *